(12) United States Patent
Schwaiger

(10) Patent No.: US 8,416,042 B2
(45) Date of Patent: Apr. 9, 2013

(54) TRANSFORMER SYSTEM

(75) Inventor: Arnold Schwaiger, Regensburg (DE)

(73) Assignee: Starkstrom-Geratebau GmbH, Regensburg (DE)

( * ) Notice: Subject to any disclaimer, the term of this patent is extended or adjusted under 35 U.S.C. 154(b) by 0 days.

(21) Appl. No.: 13/057,979

(22) PCT Filed: Aug. 5, 2009

(86) PCT No.: PCT/EP2009/060143
§ 371 (c)(1),
(2), (4) Date: May 3, 2011

(87) PCT Pub. No.: WO2010/015651
PCT Pub. Date: Feb. 11, 2010

(65) Prior Publication Data
US 2011/0221554 A1    Sep. 15, 2011

(30) Foreign Application Priority Data
Aug. 7, 2008 (EP) .................................. 08161996

(51) Int. Cl.
*H01F 27/08* (2006.01)
*H01F 27/10* (2006.01)
(52) U.S. Cl. .................. 336/60; 336/55; 336/57; 336/58
(58) Field of Classification Search ............... 336/55–60
See application file for complete search history.

(56) References Cited

U.S. PATENT DOCUMENTS

| | | | |
|---|---|---|---|
| 2,403,072 A * | 7/1946 | Gates | 336/5 |
| 4,523,169 A * | 6/1985 | Hay | 336/60 |
| 6,812,818 B2 * | 11/2004 | Lee | 336/55 |
| 7,504,742 B2 * | 3/2009 | Wobben | 290/55 |

| | | | |
|---|---|---|---|
| 2005/0167989 A1 | 8/2005 | Kruger-Gotzmann et al. |
| 2006/0145484 A1 | 7/2006 | Kruger-Gotzmann et al. |
| 2006/0220386 A1 | 10/2006 | Wobben |
| 2007/0152449 A1 | 7/2007 | Wobben |
| 2007/0187956 A1 | 8/2007 | Wobben |
| 2008/0143118 A1 | 6/2008 | Wobben |
| 2010/0007153 A1 | 1/2010 | Wobben |

FOREIGN PATENT DOCUMENTS

CN        1666020 A        9/2005
(Continued)

OTHER PUBLICATIONS

European official action, Jul. 6, 2011, in EP Application No. 08 161 996.7-1231.
(Continued)

*Primary Examiner* — Mohamad Musleh
*Assistant Examiner* — Ronald Hinson
(74) *Attorney, Agent, or Firm* — Nixon & Vanderhye P.C.

(57) ABSTRACT

To improve the cooling efficiency of a transformer operated in a wind power station, there is provided a cooling system comprising a transformer guard housing having a first opening for supply of a transformer cooling medium and having a second opening for discharge of the transformer cooling medium. Further, a first channel system supplies the transformer cooling medium to the transformer guard housing. A second channel system discharges the transformer cooling medium from the transformer guard housing. Through the provision of the cooling system, a controlled flow of cooling medium to the transformer accommodated in the transformer guard housing increases operative efficiency of the installation.

11 Claims, 7 Drawing Sheets

| | FOREIGN PATENT DOCUMENTS | |
|---|---|---|
| CN | 200990276 Y | 12/2007 |
| DE | 199 47 915 | 4/2001 |
| DE | 199 47 915 A1 | 4/2001 |
| DE | 100 46 522 | 8/2002 |
| DE | 100 46 522 C1 | 8/2002 |
| DE | 10046522 C1 | 8/2002 |
| DE | 102 33 947 | 2/2004 |
| DE | 102 33 947 A1 | 2/2004 |
| DE | 103 10 036 | 8/2004 |
| DE | 103 10 036 A1 | 8/2004 |
| WO | WO 02/23562 | 3/2002 |
| WO | WO 2004/016945 | 2/2004 |

OTHER PUBLICATIONS

International Search Report for PCT/EP2009/060143, mailed Sep. 10, 2009.

European Search Report, Nov. 10, 2008, in corresponding European Application No. 08 161 996.7-231.

English translation of Chinese official action, Mar. 12, 2012 in corresponding Application No. 200980138152.5.

English translation of Official Action from State Intellectual Property Office of the People's Republic of China, dated Oct. 25, 2012, in Chinese Application No. 200980138152.5.

* cited by examiner

TRANSFORMER SYSTEM

TECHNICAL FIELD

The technology relates to a transformer system, in particular to the cooling of a transformer being operated in a wind power station.

BACKGROUND

Wind power stations are operated for conversion of wind energy into other forms of energy, typically electricity. The increasing popularity of wind power stations may be explained by the renewability of wind energy, its wide distribution, and its potential to reduce greenhouse gas emissions. There are now many thousands of wind power stations operating, as wind power has been one of the fastest growing energy sources over the recent years.

In DE 199 47 915 A1, there is described a cooling system for a wind power station. In particular, there is described a cooling system for a power converter assembly in a wind power station. On the top of the tower of the wind power station, there is provided a machining room having a generator. At the bottom of the tower, there is provided a further room accommodating constructive elements. Further, there are provided means for guidance of cooling medium through the tower from the lower part to the upper part.

In DE 102 33 947 A1, there is described a wind power station having a gondola, which gondola again comprises a generator and a turbine having at least one rotor. The generator is coupled to a primary cooling circuit, and the gondola has means for cooling of the primary cooling circuit.

In DE 100 46 522 C1, there is described a device for detecting the operative temperature of a transformer winding. The sensor is arranged outside the winding and provided within a streaming channel so as to avoid the electric characteristics of the winding through the temperature sensor. A streaming channel is closed for increased accurateness of temperature detection.

In U.S. Pat. No. 2,403,072, there is described an electrical induction apparatus. The electrical induction apparatus has a core structure having a vertically positioned winding leg, a plurality of cylindrical windings about the winding leg, spaced from the leg and from one another to provide spaces for a flow of air as a cooling and insulating medium upwardly along the inner and outer surfaces of several windings.

In DE 103 10 036 A1, there is described a method for construction of a wind power station. A power module comprising at least a transformer is provided in the bottom of a tower of the wind power station. Here, the power module is encapsulated in a container. The container has a size such that there remains a space between the side walls of the container and the inner walls of the tower of the wind power station. However, as the container is fully encapsulated, there is no exchange of any air between the inner side of the container and the atmosphere.

SUMMARY

In view of the above, the object is to achieve improved cooling of transformers being operated in a wind power station.

This object is solved by a cooling system for a transformer being operated in a wind power station. The cooling system comprises the features of claim 1.

Through provision of inlet and outlet openings in the transformer guard housing it is possible to achieve a significantly improved cooling of the transformer. This allows to achieve controlled cooling of the transformer and to reduce the amount of materials used for the construction thereof. Also, the provision of the transformer guard housing achieves increased protection of maintenance personnel and fire protection. Finally, the cooling system and the transformer may be tested prior to installation thereof in the wind power station at the production facilities to increase the reliability of the overall transformer system.

According to an example embodiment, the first channel system is connected to a supply box being mounted in a tower wall or a gondola of the wind power station. Preferably, the second channel system is connected to a discharge box being mounted in the tower wall or a gondola of the wind power station. Optionally, the supply box may be provided with a filter system.

According to this example embodiment, it is possible to provide, e.g., fresh air from the outside of the wind power station to the location where the transformer is operated. To avoid any contamination of the transformer, the filter system may remove any contaminants comprised in the air flow from the outside. Also, the use of a discharge box supports controlled discharge of the transformer cooling medium to the outside of the wind power station.

According to a further example embodiment, a fan is provided, e.g., in the first channel system, in the second channel system, and/or in the discharge box.

According to this example embodiment, it is possible to increase the flow rate of the transformer cooling medium in the system. When the fan is operated according to transformer loss, e.g., switched off when the transformer is out of operation and switched on when the transformer loss exceeds a certain threshold, this allows for optimized cooling of the transformer in dependence of the operative conditions and for saving of energy when no operation of the fan is necessary.

According to a further example embodiment, the first channel system is coupled with the second channel system for provision of a cooling circle within the tower of the wind power station. The cooling circle is coupled to a heat exchanger provided for the wind power station, e.g., mounted to the outer wall of the wind power station, within the tower of the wind power station, or in the gondola of the wind power station.

According to this example embodiment, it is possible to decouple the flow of the transformer cooling medium from the outside of the transformer guard housing. This achieves reduced contamination of the transformer within the transformer guard housing.

Further, the object outlined above is achieved through provision of a specific transformer for operation in a wind power station. The transformer comprises a transformer core and at least one transformer winding being wound around the transformer core. The transformer winding is provided with at least one cooling channel for conduction of the transformer cooling medium. Preferably, there is provided an additional space between at least one low voltage winding and high voltage winding for establishment of an additional cooling channel.

According to the second aspect, the provision of windings with cooling channels and the spacing between high and low voltage windings supports the cooling of the transformer, in particular in combination with the cooling system outlined above.

According to a further example embodiment, the transformer is provided within the transformer guard housing described above, and preferably there is provided at least one guiding plate for guiding the transformer cooling medium to the transformer and the related cooling channels.

This example embodiment allows to combine the advantages of the inventive cooling system and the inventive transformer. The provision of guide plates optimizes the flow of the transformer cooling medium, both from the outside to the transformer and also through the cooling channels of the transformer.

According to further example embodiments, the transformer may be provided with a temperature sensor for detection of a transformer loss and protective device to detect operative disturbances of the transformer.

These example embodiments achieve increased fail safety during operation of the transformer within the inventive cooling system.

BRIEF DESCRIPTION OF DRAWING

In the following, example embodiments will be described with reference to the drawing, in which.

DESCRIPTION OF EXAMPLE EMBODIMENTS

Figure 1:
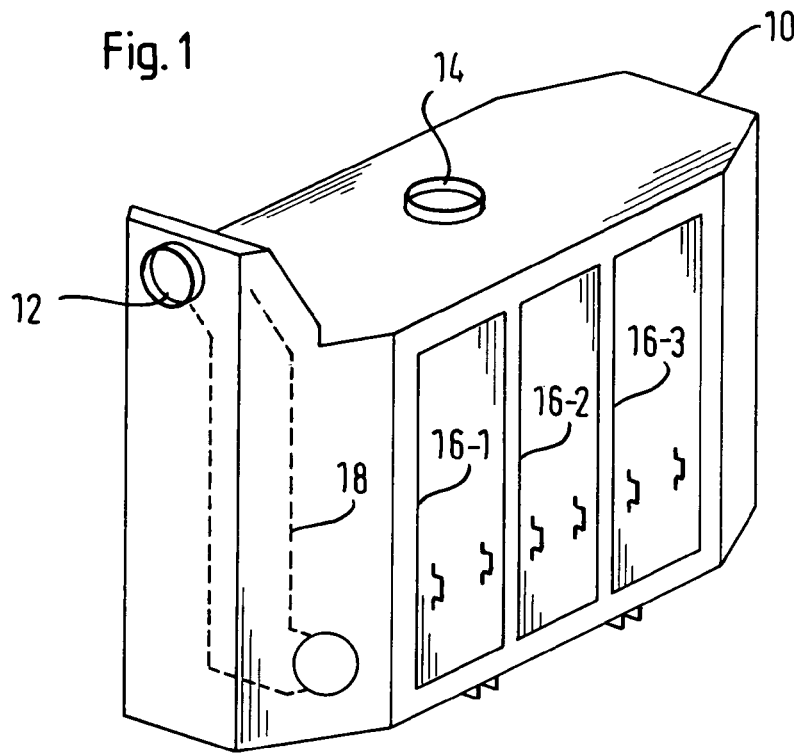
FIG. 1 shows a first example of a transformer guard housing.

In the following, different embodiments and examples will be explained with reference to the drawing.

FIG. 1 shows a first example of a transformer guard housing.

As shown in FIG. 1, the transformer guard housing 10 comprises a first opening 12 for supply of a transformer cooling medium. Further, the transformer guard housing comprises a second opening 14 for discharge of the transformer cooling medium. As shown in FIG. 1, the transformer guard housing may also be provided with one or more access doors 16-1, 16-2, 16-3 for access to the transformer accommodated in the transformer guard housing during maintenance thereof.

As shown in FIG. 1, within the protective guard housing 10 there may be provided an internal channel system 18 shown in dashed lines, for guidance of the supplied transformer cooling medium from the first opening 12 to a lower part of the transformer guard housing 10 prior to forwarding thereof to the transformer. The provision of an internal channel system 18 allows for an installation of the transformer guard housing at a lower level within the wind power station.

Figure 2:
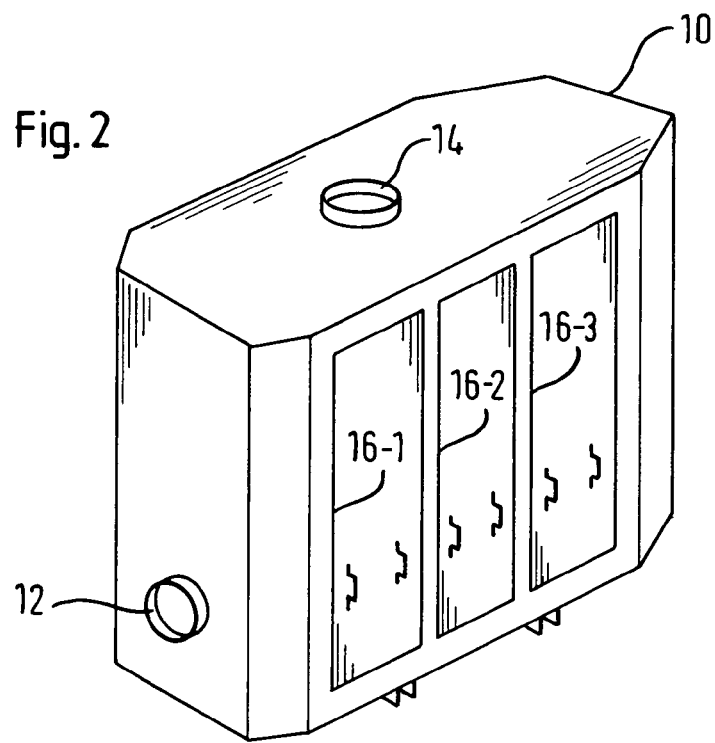
FIG. 2 shows a second example of a transformer guard housing.

FIG. 2 shows a further example of the transformer guard housing 10.

The second example shown in FIG. 2 differs over the first example in that the interior channel system is omitted, as the first opening 12 is provided at a lower level of the transformer guard housing 10. Such an example of the transformer guard housing 10 may be used when the transformer guard housing 10 is mounted at a higher level in the tower of the wind power station.

Generally, it should be noted that the location of the first opening 12 and the second opening 14 is not restricted in any way and is suitably adapted to any requirements existing for an installation within a wind power station. Also, the protective guard housing 10 may as well be placed in the gondola of the wind power station.

Figure 3:
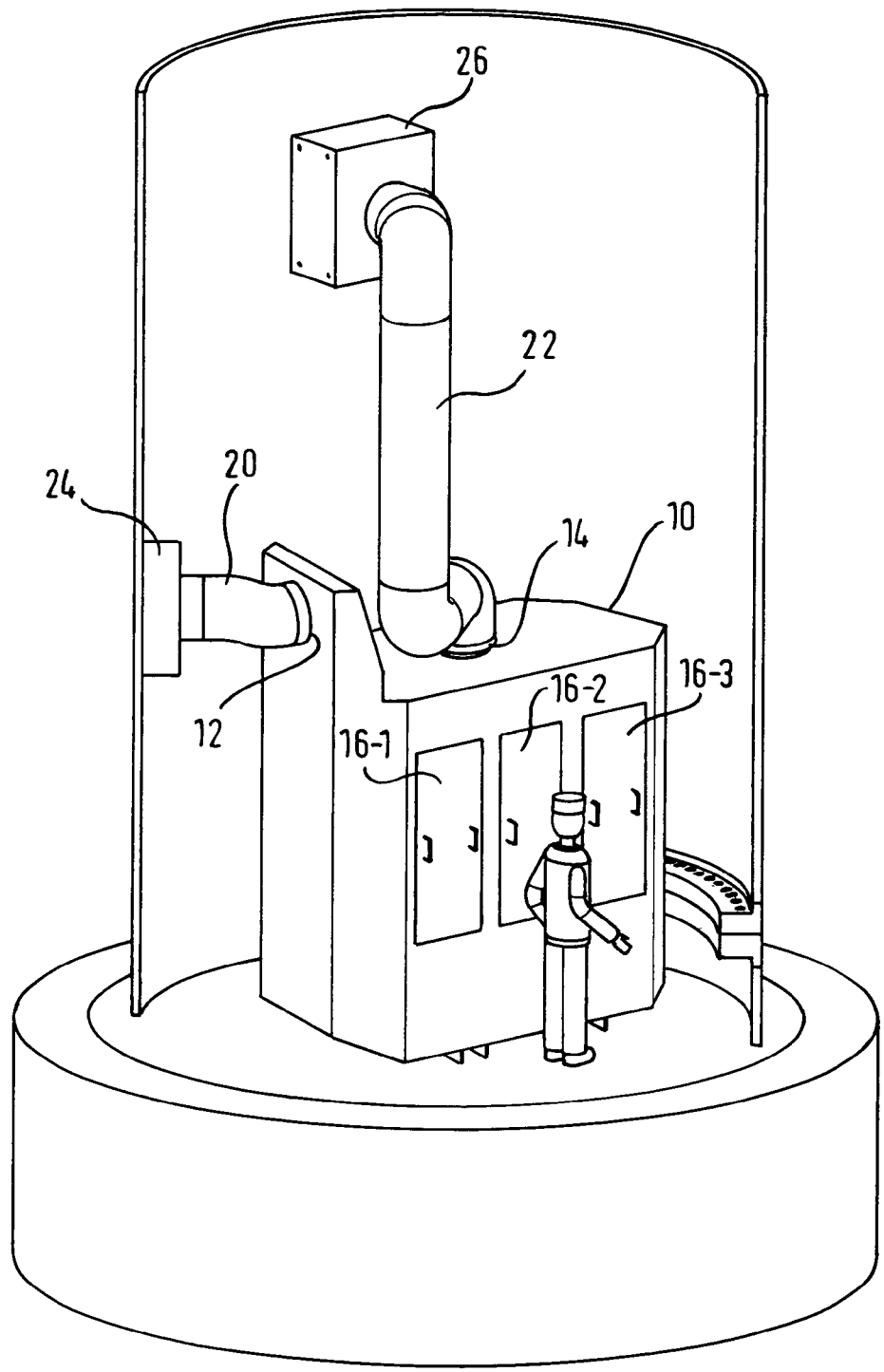
FIG. 3 shows an example of installation of the transformer guard housing shown in FIG. 1 at the bottom of the tower of a wind power station.

FIG. 3 shows an example of an installation of the transformer guard housing 10 within a wind power station.

As shown in FIG. 3, the transformer guard housing 10 may be mounted on a foundation of the wind power station. Also, the first opening of the transformer guard housing 10 is connected to a first channel system 20 for supply of the transformer cooling medium. The second opening 14 is connected to a second channel system 22 for discharge of the transformer cooling medium after cooling of the transformer. The first channel system 20 may be connected to a supply box 24 being mounted in a tower wall of the wind power station. The second channel system 22 may be connected to a discharge box 26 also being mounted in the tower wall of the wind power station. Optionally, the supply box 24 may be provided with a filter system. Alternatively, when the transformer guard housing is mounted in the gondola of the wind power station, it is understood that the supply box 22 and the discharge box 24 are as well be mounted at an appropriate site in the gondola.

Operatively, for the installation shown in FIG. 3, there is used outside air as a transformer cooling medium. However, it should be noted that any other type of material suitable for the cooling of a transformer may be used.

As shown in FIG. 3, outside air is supplied through the supply box 24 and the first channel system 20 to the first opening 12 of the transformer guard housing 10. After guidance of the air to the lower part of the guard housing 10 through the interior channel system, not shown in FIG. 3, the air flows from bottom to top within the transformer guard housing 10.

Then the heated air is guided through the second opening 14 and the second channel system 22 to the discharge box 26. Further, during maintenance, the personnel may have access to the transformer accommodated on the transformer guard housing through the openings 16-1, 16-2, 16-3.

There is provided a defined cooling system which may be tested in the factory and assures that the results of the manufacturing tests remain valid after installation in the wind power station.

Further, through the optimized provision of the cooling system, material and necessary space may be reduced significantly. The defined stream of the transformer cooling medium achieves reduced heating of the windings of the transformer. The transformer may be of a climate class C2 and may be operated, e.g., in a temperature range between −25° C. and +40° C. or even between −50° C. to +50° C.

As shown in FIG. 3, the transformer guard housing 10, e.g., constructed of zinc coated steel sheet, protects the personnel from electric conducting parts. All parts of the installation are connected to the grounding system of the wind power station. On occurrence of a failure, hot gases may be discharged through the system. Sensor devices like electric arc sensors may be used to detect disturbances and to enable a very fast turn-off of the installation. This reduces the danger and the damage to a great extent. Fire gases may also be discharged from the installation using the inventive cooling system. Requirements according to, e.g., EN 50308 may be met. Further, temperature sensors in the windings of the transformer and related measurement values are integrated into the control of the installation, which allows the stop of the installation upon unacceptable heating of the windings.

Figure 4:
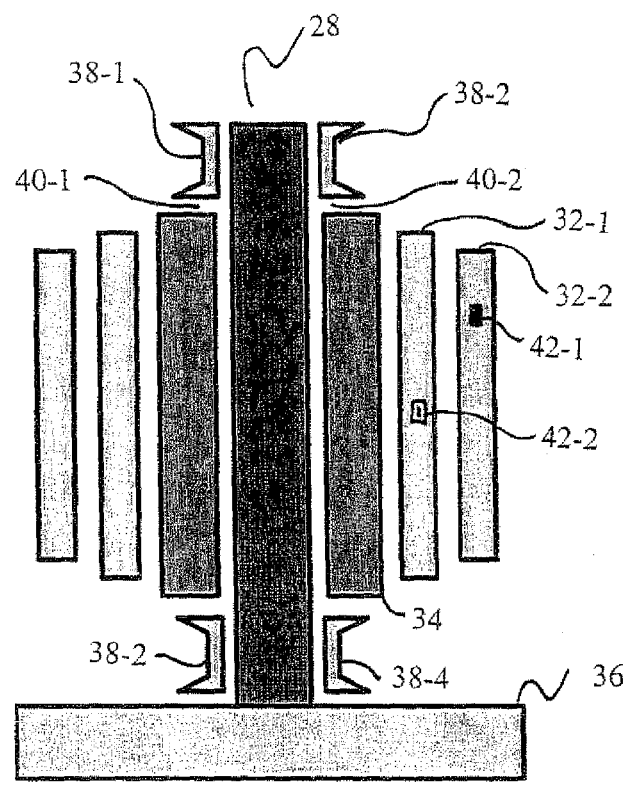
FIG. 4 shows a schematic diagram of a transformer.

FIG. 4 shows a schematic diagram of a transformer.

The transformer 28 may be a dry-type transformer, e.g., a cast-resin dry-type transformer.

As shown in FIG. 4, the transformer 28 comprises a transformer core 30, at least one high voltage winding 32-1, 32-2, and at least one low voltage winding 34. The transformer core 30 is mounted on a support 36 and fixed by frames 38-1 through 38-4. Optionally, there may be provided springs, e.g., disc springs 40-1, 40-2 to absorb vibrations during transport of the transformer 28. Optionally, in one or more windings there may be provided one or more temperature sensors 42-1, 42-2 for detection of the winding temperature during operation of the transformer 28.

As shown in FIG. 4, there are provided spaces between each of the windings, i.e. between the first and second high voltage windings 32-1 and 32-2 and further between the inner high voltage winding 32 and the low voltage winding 34 to establish cooling channels, so that during operation of the transformer 28 the transformer cooling medium may flow between the windings of the transformer 28. Also, FIG. 4 shows the provision of spaces between more than two transformer windings, it should be understood that provision of only a single space between any of the windings or any other modification is also covered.

Figure 5:
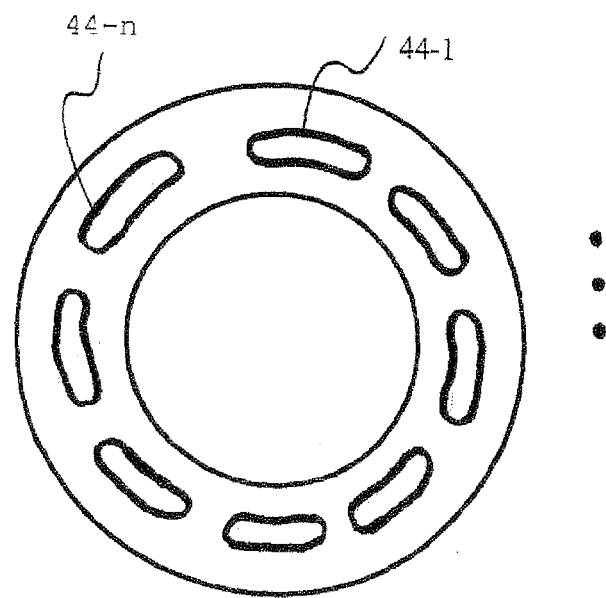
FIG. 5 shows a schematic diagram of a transformer winding.

FIG. 5 shows a cross-section through one of the windings of the transformer 28.

As shown in FIG. 5, it is suggested to provide at least one cooling channel 44-1 to 44-$n$ in the transformer winding to achieve additional cooling of the transformer winding also from the inside. Here, it should be noted that provision of additional cooling channels 44-1 to 44-$n$ may be provided either for the high voltage winding, the low voltage winding, or a combination thereof. Also, the number of the additional cooling channels 44-1 to 44-$n$ may be freely configured according to the operative conditions of the transformer 28.

In the following, the conditions for connection of the transformer to the power network will be discussed.

World-wide wind parks are very often established far away from consumer centres or conventional power station centres. Due to the steady increase of wind power in the consumer centres, the requirements of the network operators with respect to the electric behaviour go up. Depending on the prevailing conditions in different countries, there exist different requirements with respect to voltage variations due to the power behaviour of the wind parks and with respect to the behaviour on failure. A certain amount of inductive and capacitive reactive power must be provided.

As transformers are the connection between the power network and the wind generator, the power network connection conditions have a significant impact on the design of transformers and therefore also on the manufacturing costs. Excess voltages at the transformer, due to higher network voltages or capacitive load, lead to an over-excitation and therefore to an unacceptable heating of the transformer cores. This may be compensated by reduction of the inductance, i.e. by increased use of magnetic steel sheet.

The nominal power of the wind power station should also be provided at a condition of under-voltage. Therefore, the transformer must be designed so as to be operable in a continuous manner with increased current. Through use of the optimized cooling of the inventive transformer and the cooling channels in the windings and further through the design of the transformer core it is possible to significantly reduce this extra expenditure.

Further, as wind power stations are transported in a great number over long distances, the mechanic load on the transformers due to truck, ship, or railway transportation has to be considered. Heretofore, the transformer for wind power stations is provided with glue laminated core steel sheets having high mechanical stability. To even further increase this mechanical stability, the laminated core steel sheets are secured through core joints. Optionally, the transformer core may be even further stabilized using winding bands. Yet another measure to increase mechanical stability is the provision of disc springs to support windings with respect to the core and the frame.

In the following, different examples of the cooling system will be explained with respect to FIGS. 6 to 9.

Figure 6:
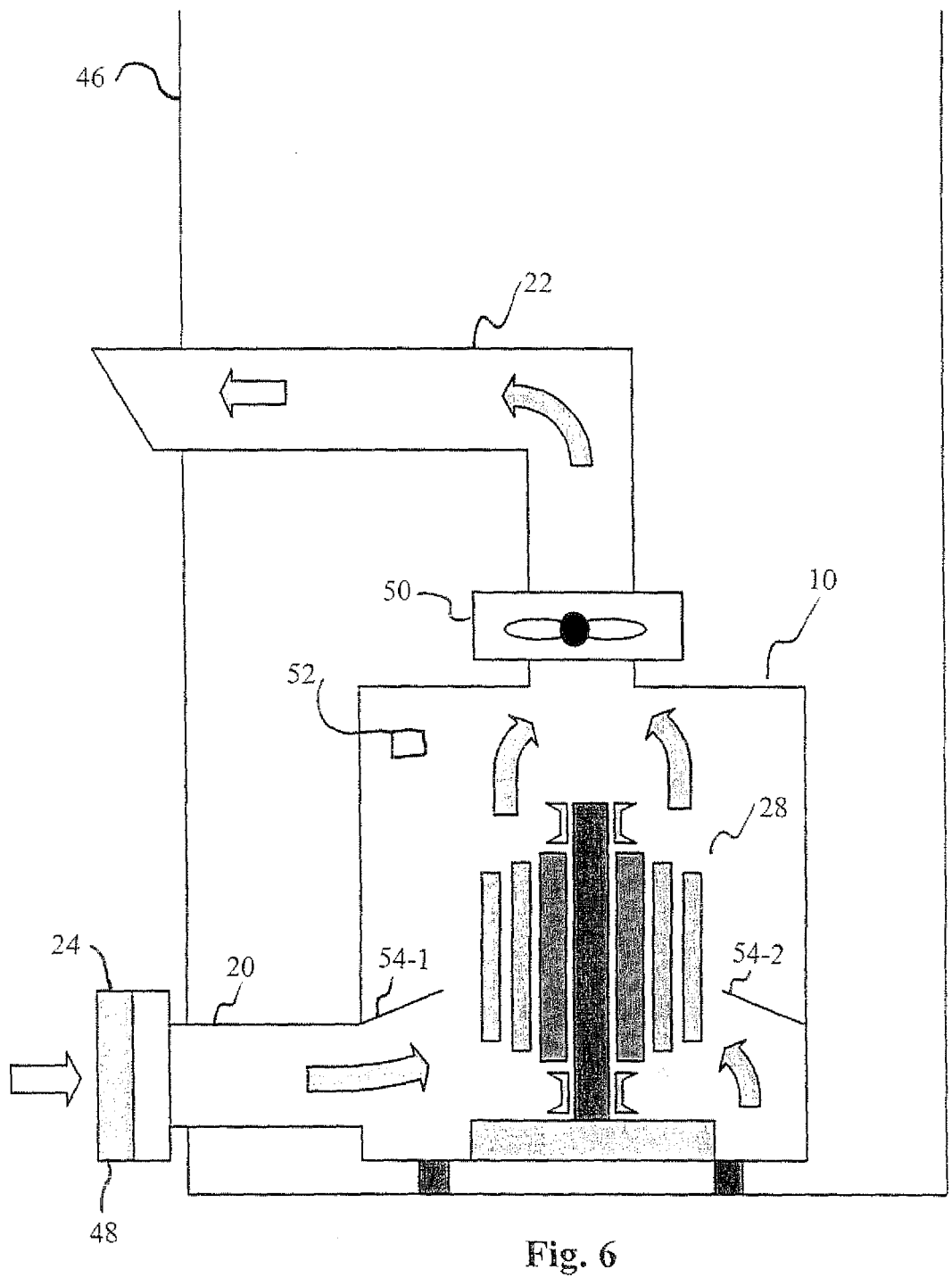
FIG. 6 shows a first example of a cooling system.

FIG. 6 shows a first example of the cooling system. Insofar as the figure shows elements explained with respect to the FIGS. 1 to 5, an explanation thereof will not be repeated to avoid redundancy.

As shown in FIG. 6, the cooling system is provided within a tower 46 of a wind power station. Further, the transformer guard housing 10 is provided and mounted at the lower side of the tower 46. Also, the supply box 24 comprises a filter system 48 for filtering of contaminants in the in-flow. The provision of the filter 48 avoids contamination of the transformer 28.

As also shown in FIG. 6, at the second opening 14 of the transformer guard housing 10 there is provided a fan 50. It should be noted that the fan 50 may also be arranged at any other appropriate place within the cooling system, e.g., in the first channel system 20, in the second channel system 22, or within the discharge box 26 (not shown in FIG. 6). Operatively, the fan 50 increases convection of cooling air within the cooling system to increase operative efficiency. As outlined above, the operation of the fan 50 may be controlled in dependence of the temperature of the windings of the transformer 28 which may vary during operation of the transformer 28.

Preferably, to reduce power consumption within the cooling system the fan 50 is turned off in consideration of the transformer losses. In other words, the no-load losses or the losses at a low load of, e.g., up to 1,000 KVA may be discharged without switching on the fan 50. Only at higher loads the fan 50 is turned on through control by the temperature sensor(s) provided in the windings of the transformer 28.

As shown in FIG. 6, there may be provided a protective device 52 to detect operative disturbances of the transformer 28, e.g., an electric arc. Upon detection of such a failure operation of the wind power station may be stopped to avoid any destruction to the cooling system and the transformer 28.

As shown in FIG. 6, the transformer guard housing 10 may also be provided with at least one guiding plate 54-1, 54-2. Provision of guiding plates 54-1, 54-2 increases the efficiency of the flow of the transformer cooling medium such that the flow of the cooling medium to the transformer, within the cooling channels of the transformer, and to the outlet opening of the transformer guard housing 10 is optimized. Also, it should be noted that the number of the guiding plates may be suitably selected in dependence of the operative conditions within the transformer guard housing 10. The same also applies to the positioning and arrangement thereof within the transformer guard housing 10.

Figure 7:
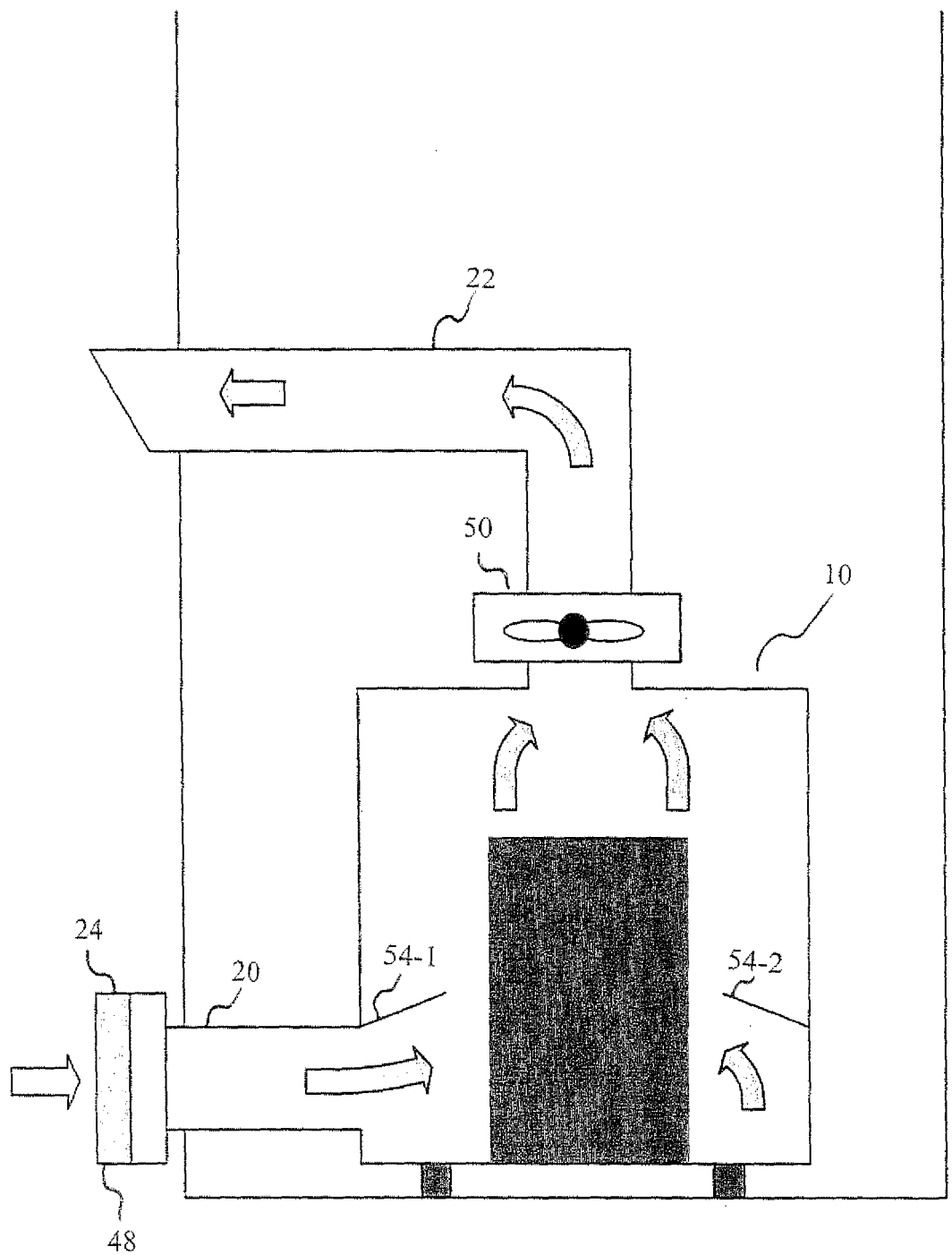
FIG. 7 shows a second example of a cooling system.

FIG. 7 shows a second example of the cooling system.

The example shown in FIG. 7 differs from the one shown in FIG. 6 with respect to the type of installed transformer. While FIG. 6 shows the use of a dry-type transformer, FIG. 7 illustrates that also, e.g., an oil-cooled transformer may be suitably installed within the transformer guard housing 10. Also in this case, the cooling efficiency for the transformer may be improved significantly through the cooling system.

Figure 8:
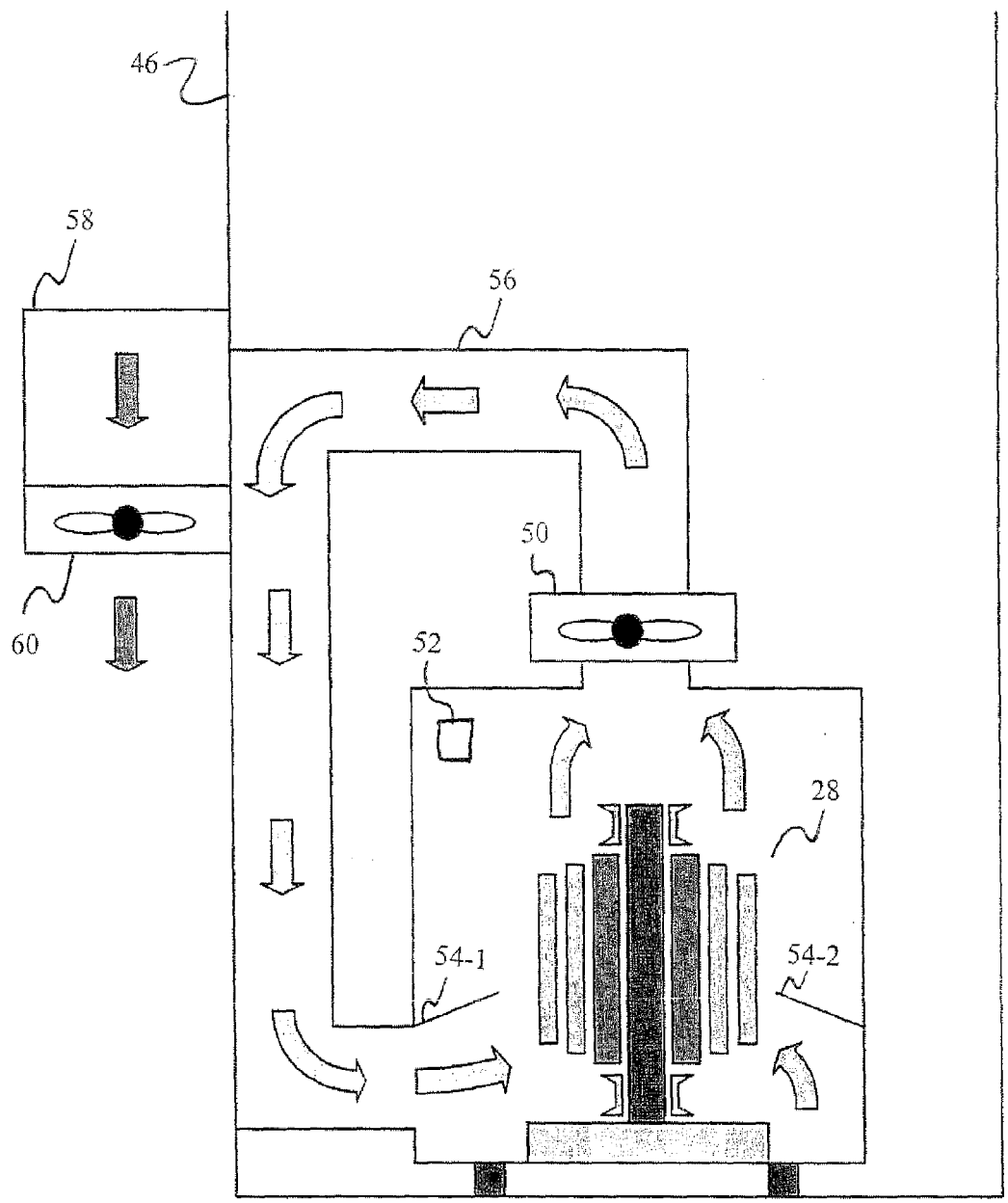
FIG. 8 shows a third example of a cooling system.

FIG. 8 shows a third example of the cooling system.

As shown in FIG. 8, according to this third example the first channel system coupled with the second channel system for provision of a cooling circle 56 provided in the tower 46 of the wind power station. The inner circle 56 is thermally coupled to an outer cooling circuit 58, e.g., provided as a heat exchanger through establishment of an air-to-air cooling system. The external circuit 58 is provided with an additional fan 60 to increase cooling efficiency thereof. The third example of the cooling system achieves increased protection of the transformer 28 against contamination, as no external cooling medium supplied through an opening in the tower wall may reach the transformer 28.

Figure 9:
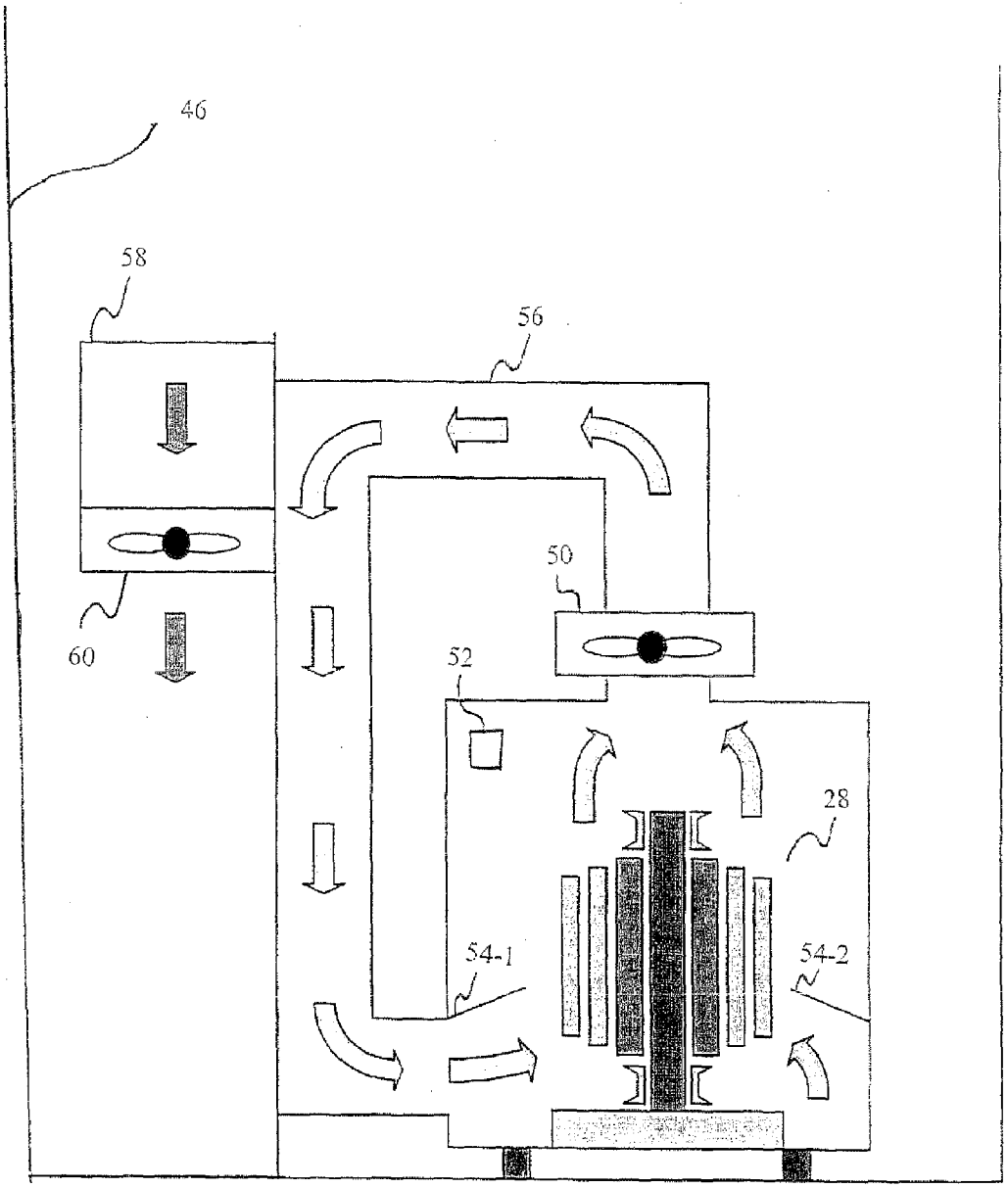
FIG. 9 shows a fourth example of a cooling system.

FIG. 9 shows a fourth example of the cooling system being a modification of the third example.

As shown in FIG. 9, according to the fourth example of the cooling system the heat exchanger is provided within the tower 46 of the wind power station.

It should be noted that the heat exchanger is not restricted to the air-air cooling system type but may as well be of the air-fluid cooling system type, e.g., the air-water cooling system type. A further option would be the use of a plate cooling system in the heat exchanger.

Also, it should be noted that the cooling system according to the third and fourth example may as well be installed in the gondola of the wind power station.

Overall, the technology described above achieves targeted cooling of a transformer operated in a wind power station. The optimized cooling is supplemented by increased protection of maintenance personnel, increased fire protection, appropriate power network connection conditions and consideration of transport conditions and vibrations during transport. The technology described also above offers a manufacturing facility tested, reliable and cost-efficient option for the secure network connection of wind power stations. It may be used with on-shore wind power stations, e.g., in a power range of 1.6 MVA to 4 MVA maximum operative voltage of UM 36 KVA.

The invention claimed is:

1. A cooling system for a transformer being operable in a wind power station, comprising:
    a transformer guard housing having a first opening for supply of a transformer cooling medium and having a second opening for discharge of the transformer cooling medium;
    a first channel system for supply of the transformer cooling medium to the first opening of the transformer guard housing; and
    a second channel system for discharge of the transformer cooling medium from the second opening of the transformer guard housing,
    wherein the first channel system is connected to an supply box being in a mounted on an inside tower wall of the wind power station to receive transformer cooling medium from outside the wind power station and the second channel system is connected to a discharge box being mounted on an inside tower wall of the wind power station to discharge transformer cooling medium outside the wind power station, or the first channel system is connected to a supply box being mounted in a gondola of the wind power station to receive transformer cooling medium from outside the wind power station and the second channel system is connected to a discharge box being mounted in the gondola of the wind power station transformer to discharge cooling medium outside the wind power station.

2. A cooling system according to claim 1, wherein the supply box is provided with a filter system.

3. A cooling system according to claim 1, further comprising a fan provided in the first channel system, in the second channel system, and/or in the discharge box.

4. A cooling system according to claim 3, wherein the fan is operable according to a transformer loss.

5. A cooling system according to claim 4, wherein the fan is operable according to the transformer loss such that no-load losses or losses at a low load are discharged without switching on the fan and losses at a higher load are discharged with the fan being turned on through control of at least one temperature sensor being provided in at least one winding of the transformer.

6. A transformer for operation in a wind power station, comprising:
    a transformer core; and
    at least one transformer winding being wound around the transformer core, the at least one transformer winding being provided with at least one cooling channel for conducting a transformer cooling medium,
    wherein the transformer is provided with the cooling system according to claim 1 and is accommodated in the transformer guard housing of the cooling system.

7. The transformer according to claim 6, further comprising at least one low voltage winding and at least one high voltage winding,
    wherein there is a space between the low voltage winding and the high voltage winding for establishing a further cooling channel.

8. The transformer according to claim 6, wherein the transformer guard housing includes at least one guiding plate for guiding the transformer cooling medium to the transformer.

9. The transformer according to claim 6, wherein the temperature sensor in the at least one transformer winding is configured to detect a transformer loss.

10. The transformer according to claim 6, further comprising a protective device to detect operative disturbances of the transformer.

11. The transformer according to claim 6, wherein the transformer comprises laminated core sheet steels being secured through core joints.

* * * * *